Oct. 22, 1963  J. B. LONG  3,107,776
ARTICULATING AND TELESCOPING CONVEYING SYSTEM
Filed Feb. 1, 1960  12 Sheets-Sheet 1

INVENTOR
JOHN B. LONG
BY
ATTORNEYS

Oct. 22, 1963 J. B. LONG 3,107,776
ARTICULATING AND TELESCOPING CONVEYING SYSTEM
Filed Feb. 1, 1960 12 Sheets-Sheet 4

INVENTOR
JOHN B. LONG
BY
ATTORNEYS

Oct. 22, 1963 J. B. LONG 3,107,776
ARTICULATING AND TELESCOPING CONVEYING SYSTEM
Filed Feb. 1, 1960 12 Sheets-Sheet 6

INVENTOR
JOHN B. LONG
BY
ATTORNEYS

Oct. 22, 1963   J. B. LONG   3,107,776
ARTICULATING AND TELESCOPING CONVEYING SYSTEM
Filed Feb. 1, 1960   12 Sheets-Sheet 7

INVENTOR
JOHN B. LONG
BY
ATTORNEYs

INVENTOR
JOHN B. LONG 3,107,776
ARTICULATING AND TELESCOPING
CONVEYING SYSTEM
John B. Long, Oak Hill, W. Va., assignor, by mesne assignments, to Marmon-Herrington Company, Inc., Indianapolis, Ind., a corporation of Indiana
Filed Feb. 1, 1960, Ser. No. 5,817
6 Claims. (Cl. 198—89)

This invention relates to improvements in continuous conveying systems.

Various conveying systems for use in mining have been developed over the years in an attempt to provide for the uninterrupted flow of coal or other mined materials from the face of the mine to the outside. Such systems as have been designed utilize either a chain and flight conveyor such as that shown in the patent to A. R. Long and J. B. Long, 2,420,085, granted May 6, 1947, or a belt conveyor, such as that shown in the patent to J. B. Long and J. C. Clay, 2,896,774, granted July 28, 1959.

These chain and belt conveyors have provided improvements over previous apparatus in facilitating haulage from loading point to discharge, however, the apparatus has lacked true continuity, inasmuch as the method of loading determined the load carried by the conveyor. The spot usage of this equipment, together with other equipment that has not been specifically designed to cooperatively operate therewith, has resulted in surge or lot conveying whereby conveyors of greater capacity are required than would be the case if the material is continuously loaded. Such systems are therefore obsolete, ineffective and uneconomical from the date of their installation under competitive conditions.

In the evolution of mining apparatus for conveying material from the loading point to the outside, there was developed a transfer conveyor for attachment to the loading machine or continuous miner at one end thereof and discharging upon a conveyor at the other end thereof, the same being shown in the patent to J. B. Long and R. J. Frye, No. 2,747,721, granted May 29, 1956. This transfer conveyor has been and is being used to provide a continuous flow of material, establishing exceptional production records. However, in this equipment it is necessary to frequently extend the pan line, which involves the manual handling of pans and chain with flights attached, increasing the personnel required to operate the apparatus. Such operation makes it necessary to move from face to face as the mine is developed, working through the breakthroughs in order to develop the required air in the face being worked. Therefore, even though such transfer conveyor permitted unrestricted movement of the loader and miner in the face being worked and into the breakthroughs, it did not allow, due to lack of extensible reach, the working of two or three places from the same pan line. It was therefore necessary to have a pan line in each of the places being worked, so that every time a different place was worked the loader or miner had to be uncoupled from the transfer conveyor, moved to the next place, and coupled to another transfer conveyor for working this next face. This necessitated consumption of time and effort in moving and the provision of a multiplicity and duplicity of equipment.

The primary object of this invention is the provision of an articulated continuous conveying system for mining and the like that provides extreme flexibility at the working faces of the mine and also provides for the conveying of the material mined over substantially long distances from the face of the mine to the outside, or to rail haulage. This improved system likewise combines the attributes of both chain and flight and belt conveyors in providing a completely flexible conveyor. In my invention the chain and flight conveyors operate as mobile feeders of relatively short lengths so that it is possible to operate such conveyors at capacities up to seven and eight tons per minute, and the belt conveyor provides the extensibility for conveying the mined materials from the face to the outside, the only limitation on conveyor length and room depth being set by the mining plan followed.

A further object of the invention is the provision of a continuous conveying system for mining and the like wherein multiple headings may be worked before any extension of the conveyor is required. In my improved system the articulation and extensibility thereof provides for extension without delay in the mining operation. For instance, assume that there are three places to be mined of up to twenty feet wide each, and there is provided in my improved system an extension of one hundred twenty feet, it will therefore be obvious that there may be mined the three places at a depth of fifty feet, which equals one hundred and fifty linear feet, by twenty feed wide, equalling three thousand square feet; two breakthroughs thirty feet each, and two room necks of thirty feet each, equalling one hundred and twenty linear feet by twenty feed wide, which totals twenty-four hundred square feet, so that the total mining capability will be fifty-four hundred square feet per extension. This is only one of many possible variations. Compare this with the ordinary conveyor mining wherein one six foot "pan-up" by twenty feet wide would equal one hundred and twenty square feet, for a total of one hundred and twenty square feet per "pan-up." Thus, the area mined with one extension in my improved continuous conveying system is forty-five times greater than the area mined in ordinary conveyor mining with one "pan-up."

My improved continuous conveying mining system also provides numerous other advantages, such as: decreased crew requirements, thus resulting in less labor costs per ton of coal mined; faster extensions; a forty-five to one advantage in area for each extension, as in the above noted example; there being over one hundred feet of reach in my continuous conveying system; fewer moves, there being extreme extensibility and articulation therein, it is not necessary to frequently move the basic stationary unit; more places available, which is an obvious feature from the fact that my continuous conveying system provides for the mining of breakthrough as easily as room necks; and greater flexibility in handling of the "rolls," which is brought about through the ability of my continuous conveying system to drive deeper rooms, making it economical to go through "rolls," whereas it is not economical with shorter-reach, conventional chain conveyors; also, since the equipment of my continuous conveying system moves only in the center place, squeezes in the outside places may be frequently by-passed and then attacked from the rear.

A further object is the provision of a mobile bridge carrier for a continuous conveying system, a front and rear pair of wheels being provided with each pair of wheels being independently steered. This independent steering permits movement of the mobile bridge carrier in a forward or reverse direction and to the right or left, while maintaining the center line of the machine parallel with an imaginary center line of its point of start, so that the carrier may be moved in tight against an obstruction on either side, and simply by reversing the direction of travel, or by cutting the pairs of wheels away from the obstruction, the machine can be very easily moved away from an obstruction on the side. Such movement is highly desirable in the loading operation, particularly inasmuch as the mobile bridge carrier is ordinarily manipulated in cooperation with the manipulation of the loading machine so that the proper relationship between the loading machine and the mobile bridge carrier is maintained at all times.

A further object is the provision of a mobile bridge carrier for use in continuous conveying systems having a pan line therein, the mobile bridge carrier being provided with lifting means for engagement with the pan line so that the pan line can be lifted above the ground and maneuvered into its desired position.

Other objects and advantages of the invention will be apparent during the course of the following detailed description, taken in connection with the accompanying drawings, forming a part of this specification and in which drawings:

FIGS. 1a, 1b, 1c, 1d, 1e, and 1f constitute a broken view in top plan of a continuous conveying system according to my invention; FIG. 1a showing a loading machine in delivering relationship to one end of an elongated transfer conveyor; FIG. 1b showing the opposite end of the elongated transfer conveyor of FIG. 1a mounted upon one end of a mobile bridge carrier, with one end of another elongated transfer conveyor mounted under the opposite end of the mobile bridge carrier; FIG. 1c shows the opposite end of the latter mentioned elongated transfer conveyor of FIG. 1b mounted upon one end of a mobile drive unit; FIG. 1d shows the other end of the mobile drive unit and a belt tailpiece and section of belt conveyor attached thereto; FIG. 1e shows a section of a belt conveyor, the same being sectionalized to show a plurality of rope-tie-off points, and showing belt handling apparatus mounted in juxtaposition with respect to the belt conveyor; and FIG. 1f shows the head section of the belt conveyor.

In the drawings, wherein for the purpose of illustration is shown a preferred form of the invention, and wherein similar reference characters designate corresponding parts throughout the several views, the letter A may generally designate a self-propelled dirigible loading machine; B a first elongated transfer conveyor; C a mobile bridge carrier; D a second elongated transfer conveyor; E a mobile drive unit; F a belt conveyor including a belt tailpiece G, head section H, and intermediate belt supporting structure K extending between the belt tailpiece G and the head section H; and belt handling apparatus L.

The self-propelled dirigible loading machine A is of a conventional type, including a main frame 10, a crawler mount 12, gathering mechanism 13 at the forward end of the frame 10 and a boom 14 having a rear end 15, and an elongated discharge conveyor 16 orbitally moving throughout substantially the entire length of the dirigible loading machine from the gathering mechanism 13 to the rear end 15 for moving the mined material from the gathering mechanism 13 into a position to be discharged from the rear end 15 onto the first elongated transfer conveyor B. Means 20 is provided upon the end 15 for swivelling of the receiving end of the elongated transfer conveyor B to and beneath the elongated discharge conveyor 16.

While I have shown the loading machine as comprising the forward end of my continuous conveying mining system, it will readily be understood that any conventional type of continuous mining machine may be used in front of and discharging onto the forward end of the loading machine, or onto the mine bottom to be picked up by the loading machine, in a conventional manner, so that the apparatus will take care of the complete mining operation, from the cutting of the mine face by the mining machine to the loading thereof by the loading machine, and thence through the remainder of my continuous conveying system, or discharging direct from miner to the elongated transfer conveyor connected to and beneath the discharge end of a miner.

The elongated transfer conveyors B and D are identical, and are of the type as set forth in the patent to J. B. Long and R. J. Frye, No. 2,747,721, issued May 29, 1956. Inasmuch as these elongated transfer conveyors are identical, identical reference characters will be applied to corresponding parts of each. The elongated transfer conveyors B and D each preferably include a receiving section 22; discharge section 23; intermediate pan sections 24; a flexible traveling material moving conveyor 25 supported in any suitable manner by the sections 22, 23 and 24; a power drive unit 26 carried by the receiving section 22; a carriage 27 movably attached to and supporting the discharge section 23; means 28 for swivelling the discharge section 23 upon the carriage 27; and a guide plate 29 provided upon the receiving section 22 for receiving the swivelling means of the unit attached thereto. As will be seen from the aforementioned description, and by reference to the aforementioned Patent No. 2,747,721, such an elongated transfer conveyor will provide for the swivelling of apparatus upon the receiving section 22 and for the swivelling of the discharge section 23 upon the carriage 27, providing for the articulation of elements mounted at each end thereof, and for the conveying of material throughout the length of the transfer conveyor by means of the material moving conveyor 25. The carriage 27 is provided with wheels 31 for movement upon a track means, as will be subsequently described.

In the mounting of the elongated transfer conveyor B in my continuous conveying system, it will be seen that the means 20 of the end 15 of the loading machine A is pivotally attached to the guide plate 29 of the receiving section 22, and the carriage 27 is mounted upon the mobile bridge carrier C, with the wheels 31 thereof engaging suitable track means, as will be subsequently described. There is thus provided complete articulation, through an angle of 180°, between the loading machine A and one end of the elongated transfer conveyor B. The opposite end of the elongated transfer conveyor B is mounted for one hundred and eighty degree movement with respect to the mobile bridge carrier C.

The mobile bridge carrier C preferably includes a main frame 35 upon which are mounted an electric motor 37, a starter 38 for the electric motor, hydraulic fluid pump means 39 geared to the electric motor 37 through a gear box 40, a hydraulic tank 41 for supply of the hydraulic fluid to the pumps 39, and control means 42 for actuation of and distribution of the hydraulic fluid pressure from the pumps 39. The main frame 35 is mounted upon wheels 44, each of which wheels is pivotally supported upon the main frame 35 as by joints 47, and reducer drives 48 are provided for independent rotation of each of the wheels, the reducer drives 48 being driven by hydraulic motors 50. Each of the pairs of front and rear wheels are interconnected by means of tie bars 52 for complementary turning movement. Therefore, in the tramming of the mobile bridge carrier the pair of wheels at the front end thereof may be turned independently of the wheels at the rear end thereof, each pair of the wheels being independently rotated, thus providing a carrier having a high degree of articulation.

Mounted to one side of the frame 35 are lift means 36, which lift means are provided so that the pan line of the mobile drive unit may be lifted during the movement of the mobile drive unit, as will be subsequently described. I have shown two of the lift means in the drawings, however, it will be understood that one or more may be utilized, as desired for effective lifting of the pan line. The lift means 36 preferably comprises a first boom section 43 mounted upon the frame 35; a second boom section 45 telescopically mounted upon the first boom section 43 for extension and retraction with respect to the first boom section 43; a sheave carrier 46 mounted upon the end of the boom section 45 opposite the boom section 43; a sheave 49 rotatably supported within the sheave carrier 46; a ratchet jack 51 secured at one end thereof to the first boom section 43, and extending longitudinally thereof; and a chain 53 being mounted upon the other end of the ratchet jack 51, the chain 53 extending longitudinally of the second boom section 45 and about the sheave 49, a hook 54 being provided at the terminus of the chain 53.

Figure 4:
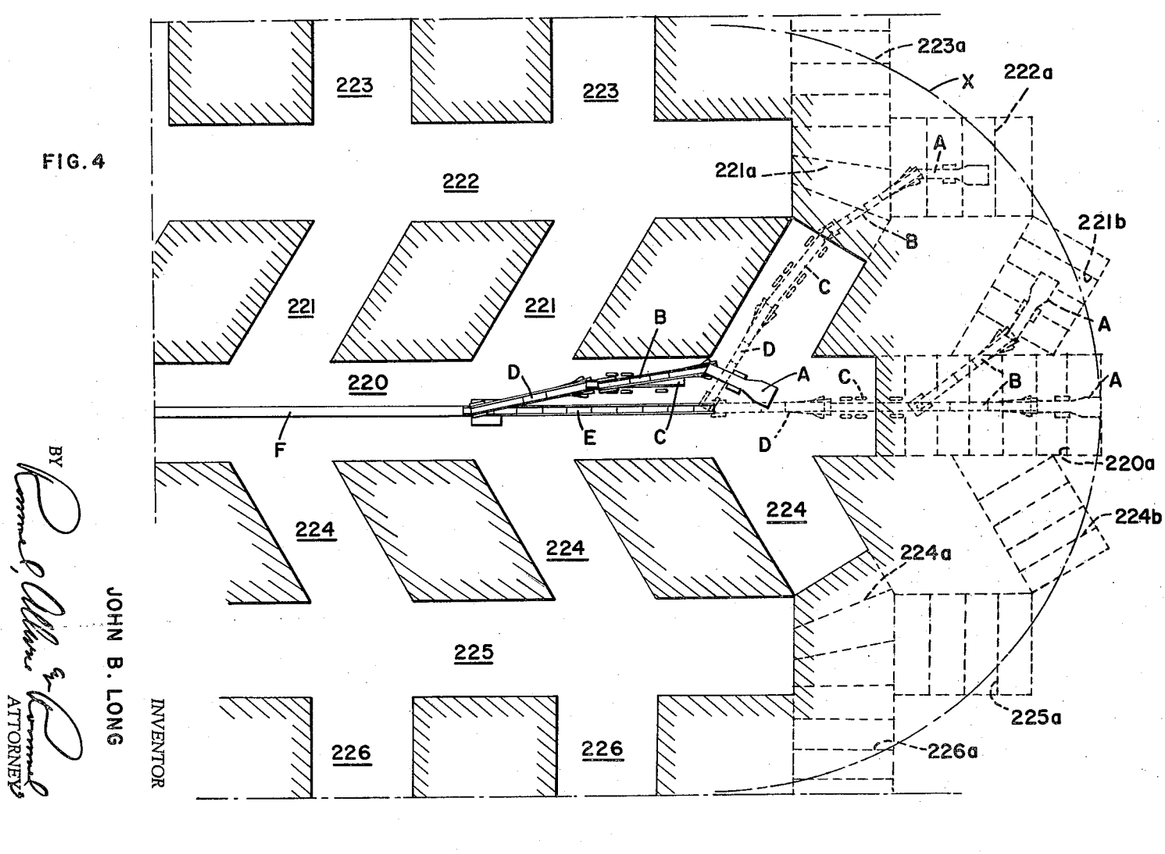
FIG. 4 is a mining plan showing use of my continuous conveying system, there being shown a plurality of headings, including rooms, breakthroughs and extended breakthroughs that may be mined by my continuous conveying system.

Mounted upon the main frame 35 is a front boom section 55 and a rear boom section 56. These boom sections are hingedly connected to the main frame as at 57 and 58, respectively, so that each may be raised or lowered with respect to the main frame, independently of each other. Front lift boom cylinders 59 are provided for raising and lowering of the front boom section 55 about the pivot axis 57, and rear lift boom cylinders 60 are provided for the raising and lowering of the rear boom section 56 about the pivot axis 58. Such independent movement of the boom sections is necessary for working in low ceiling mines, so that the front boom 55 may be placed beneath the elongated transfer conveyor B and the rear boom 56 may be attached to the elongated transfer conveyor D. Pan sections 63 and 64 constitute the front and rear boom sections, respectively, and a short pan section 65 is provided intermediate thereof, adjacent the pivot axes 57 and 58. The upwardly extending side flanges of the pan sections 63, 64 and 65 define track means 66 for movement of the elongated transfer conveyor B therealong, the wheels 31 of the elongated transfer conveyor B contacting the track means 66 and riding therealong. The elongated transfer conveyor B can therefore be telescoped entirely upon the mobile bridge carrier C, so that its length is virtually coextensive therewith, as shown in FIG. 4, and as will be subsequently described. A material moving conveyor 67 is orbitally movable throughout substantially the entire length of the mobile bridge carrier, the same extending from the receiving end 68 of the front boom section 55, where it may be driven by the hydraulic motor 69, to the discharge end 70 of the rear boom section 56. A roller 71 may be provided extending below the receiving end 68 providing a rotatable support therefor in the event this end is required to be lowered adjacent the ground floor.

Means 72 is provided at the discharge end 70 of the mobile bridge carrier C for swivelling attachment of the discharge end thereof to and above the transfer conveyor D. This means 72 is identical to the means 20 as has previously been described for the swivel attachment of the loading machine A to and above the transfer conveyor B.

Although it might appear, from the mining plans shown in FIGS. 4-9, that the loading machine A and the elongated transfer conveyor B connected thereto would permit a large area of material to be loaded while moving in a straight path, there must be, in actual practice, quite a degree of jockeying or manipulating of the mobile bridge carrier C in accordance with the movements of the loading machine A. This is due to the fact that there are very few instances of mining in an absolutely straight path, so that the mobile bridge carrier C must be manipulated with respect to the loading machine A in order to maintain the elongated transfer conveyor B in its position upon the track means 66 of the mobile bridge carrier C. A high degree of mobility and maneuverability of the mobile bridge carrier C is therefore essential in order to guarantee the proper maintenance of position of the loading machine A with respect to the mobile bridge carrier C. This is particularly true when mining around pillars, in which case the elongated transfer conveyor B will be necessarily extended almost to its farthermost point on the mobile bridge carrier C. This manipulation or jockeying of the loading machine A with respect to the mobile bridge carrier C cannot be avoided where lengths of substantially rigid conveyors are maneuvered in tight places, and the fact that my system permits the necessary articulation for such movement points up the novelty of the system over those previously used wherein the requisite articulation is not provided.

When operating space permits it is desirable to maintain the transfer conveyor B in a substantially parallel relationship with respect to the mobile bridge carrier C, providing an optimum discharging relationship between the transfer conveyor B and the mobile bridge carrier C. In order to provide for such optimum discharging relationship it is of prime importance that the mobile bridge carrier be extremely maneuverable and capable of having its receiving end moved to the right and left with a minimum of forward and reverse travel. My improved mobile bridge carrier possesses such maneuverability by virtue of its comparatively long receiving boom and running gear with a relatively short base, with each of the running gear being independently steerable with respect to the other of the running gear, so that by turning the running gear to travel in a circular path the comparatively long receiving boom will move arcuately a long distance to either the right or left with little forward or reverse movement.

The elongated transfer conveyor D is identical to the elongated transfer conveyor B, as has been hereinbefore set forth, and the interconnection of the elongated transfer conveyor D between the mobile bridge carrier C and the mobile drive unit E is believed obvious therefrom.

The mobile drive unit E is preferably of the type as set forth in my copending application Serial No. 807,784, filed April 21, 1959, for conveying mechanism. This mobile drive unit E preferably includes a main frame 74 that is movably supported upon crawler chains 75 in a conventional manner, the same being operated by the power drive unit 76 through the gear reducer and chain drive 77 and 78 which receive their motive force from the hydraulic motor. The units 77 and 78 are independently operable by means of controls 79, as it may be necessary or desired to drive one of these units in one direction while driving the other unit in the opposite direction, such as when the mobile drive unit is being turned, as is well known in the art with respect to mobile units mounted upon crawler chains.

Mounted upon the main frame 74, and extending for substantially the entire length thereof, is a trough 80 having upstanding flanged sides 82 and 83, the uppermost edges of which define track means 84, for receiving the wheels 31 of the elongated transfer conveyor D. A material moving conveyor 85 is mounted within the trough 80, intermediate the flanges 82 and 83, as will be subsequently described.

Connected to one end of the trough 80, partially supported upon the frame 74 and extending outwardly therefrom, are a plurality of pan sections 86, the endmost one of which is designated as 87. These pan sections may be of the type disclosed in the patent to A. R. Long and J. B.

Long, No. 2,420,085, dated May 6, 1947, providing an upper trough 88 for the conveying reach of the material moving conveyor 85, and having flanged sides 90 and 91 the uppermost edges of which define track means 93 that cooperate and are coextensive with track means 84 for providing a trackway for the movement of the wheels 31 of the elongated intermediate transfer conveyor D. With this arrangement, the wheels 31 of the elongated transfer conveyor D may ride upon the track means 84 and 93 for the entire length of the mobile drive unit, so that the elongated transfer conveyor D may be telescoped upon the mobile drive unit, as shown in FIG. 4, and as will be subsequently described.

The material moving conveyor 85, which in the drawings is shown as a chain and flight conveyor, is orbitally supported within the troughs 80 and 88, moving from the tail pan section 87 to the forward discharge end of the mobile drive unit E, the same being coupled for power operation to the power drive unit 76 and operated by the conventional control switch on starter case.

The tail pan section 87 is provided with a roller 98 which extends outwardly beyond the end thereof and supports the tail pan section 87 slightly above the ground floor. This roller 98 is designed to support the end of the pan sections above the mine bottom when the mobile drive unit is trammed.

Figures 3, 6:
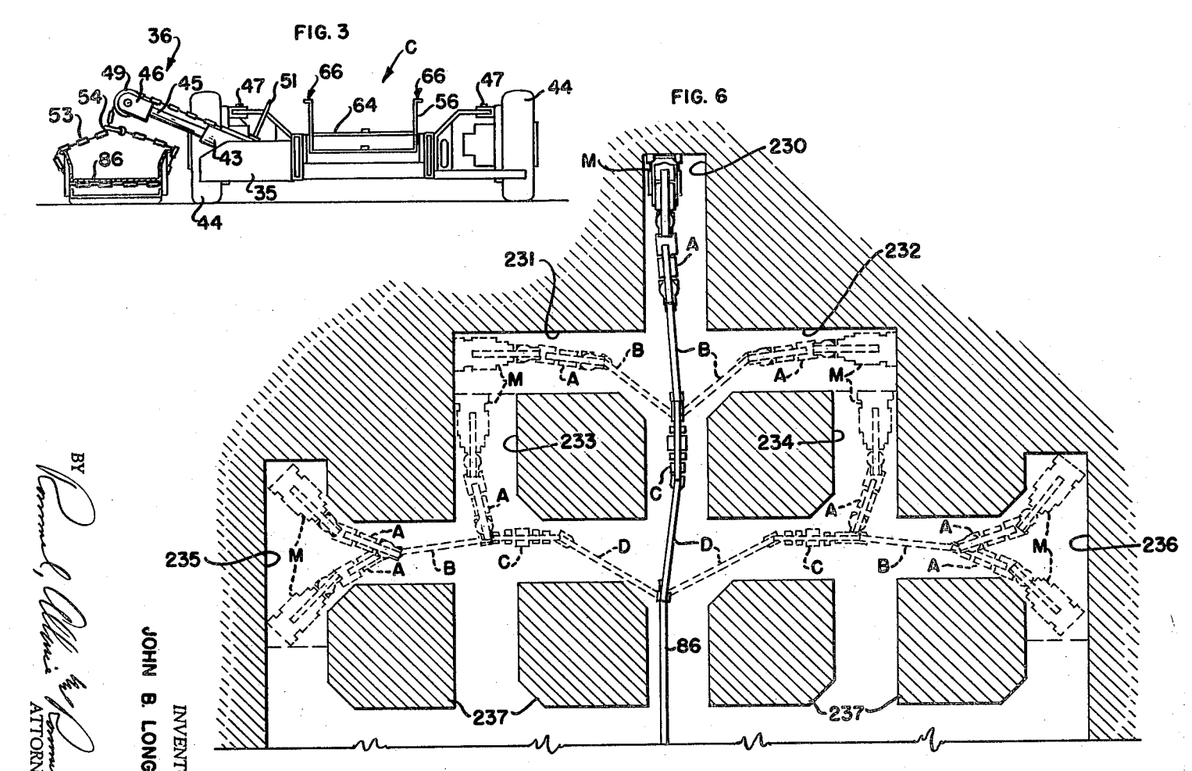
FIG. 3 is an end view of the mobile bridge carrier, taken substantially on the line 3—3 of FIG. 1b, showing the mobile bridge carrier in relationship to the pan of the mobile drive unit for the lifting of the pan line and movement of the pans to the desired position.
FIG. 6 is an enlarged view of the area designated as circle 6 of FIG. 5, showing the development of entries in this plan.

It will be recognized that when the pan sections 86, and the mobile drive unit E are moved for long distances, or in any direction not in a straight path, that the roller 98 will be relatively ineffectual in providing a guiding support for the pan sections 86. I have therefore provided the lift means 36 upon the mobile bridge carrier C for raising the pan sections 86 above the ground floor. FIG. 3 illustrates the operation in lifting the pan section 86, in which operation the chain 53 is passed about one of the pan sections 86 and the hook 54 connected to a portion of the chain, forming a loop supporting the pan sections 86. The jack 51 is then operated, drawing the chain 53 over the sheave 49 and lifting the pan section 86 from the floor. For the purposes of clarity in FIG. 3 I have somewhat diagrammatically shown both the pan sections 86 and the mobile bridge carrier C, the material moving conveyor 85 not being shown mounted in juxtaposition within the pan sections 86, and the material moving conveyor 67 not being shown in juxtaposition in the mobile bridge carrier C. The mounting of these material moving conveyors 85 and 67 are well known in the art.

The belt tailpiece G of the belt conveyor F is aligned with and secured to the discharge end of the mobile drive unit E. This belt tailpiece supports one end of the belt conveyor F beneath the discharge end of the mobile drive unit E for facile discharge of material from the mobile drive unit E to the belt.

The belt tailpiece G is likewise fully disclosed in my aforementioned copending application Serial No. 807,784, filed April 21, 1959, and preferably includes a frame having spaced apart side members 100, each having a supporting skid 101 at one end thereof and a supporting stand 102 at the other end thereof, the side members being interconnected by means of cross braces (not shown) that position the belt for gradual troughing action, as disclosed in the aforementioned application Serial No. 807,-784, filed April 21, 1959.

A tail pulley 104 is mounted between the side members 100, at one end thereof, for orbital rotation of the conveyor belt from return reach to conveying reach. A roller 105 may be provided for supporting the return reach of the belt. Mounted between the side members 100, and designed to rest upon the uppermost surface of the return reach of the belt, is a scraper 106 for removing any debris from the return reach. A pair of loading plates 107 may be provided at the uppermost surface of the side members 100, for deflecting the load discharged from the mobile drive unit onto the belt, and a pair of diversion plates 108 are provided upon each of the loading plates 107 for centering such load.

In the interconnection of the belt tailpiece G to the mobile drive unit E, it is desirable that the same be properly aligned so that there will be a straight line discharge from the mobile drive unit E to the belt, with the longitudinal axis of the belt and the mobile drive unit in substantial alignment. Therefore, in the attachment of the belt tailpiece to the mobile drive unit, a pivotal drawbar interconnection 110 is provided so that the belt tailpiece is angularly adjustable with respect to the mobile drive unit. In the form of the invention shown I have provided a pair of ratchet type type jacks 112 interconnected at one end thereof to the belt tailpiece G and at the other end thereof to the mobile drive unit E, for properly aligning and securing the tailpiece with respect to the drive unit.

The normal operating position of the belt tailpiece G will be with the supporting stand 102 raised from the ground surface, the drawbar 110 supporting one end of the tailpiece on the mobile drive unit E and the supporting skid 101 resting on the ground surface and supporting the other end of the tailpiece. The supporting stand 102 is only used when the tailpiece is entirely disconnected from the mobile drive unit.

In the tramming of the mobile drive unit and belt tailpiece it is desirable to lift the supporting skid 101 from contact with the ground and I therefore provide lifting jacks 115 interconnected between the diversion plates 108 and the discharge end of the mobile drive unit E. Such jacks may be a conventional throw type of jack, as shown in the drawings, whereupon throwing of the handle thereof the skid 101 will be lifted from the ground and when it is desired to lower the same, the handle is merely moved in the opposite direction.

Inasmuch as this belt tailpiece is preferably designed for operation with a strand supported type of belt conveyor, sheaves 117 may be provided for receiving the strands and for facile payment of the strands outwardly therefrom as the unit is advanced.

The belt conveyor F is preferably of the type shown in Patent No. 2,896,774, patented July 28, 1959, of which myself and J. C. Clay are co-inventors. This type of conveyor preferably includes a belt 120 that is supported by a plurality of conveying idler rollers 121 that are, in turn, supported upon a pair of spaced flexible side strands 123. These flexible strands extend for substantially the entire length of the conveyor, usually being tied off or connected adjacent the head section H and belt tailpiece G, to either side thereof. In the form shown in the drawings, the side strands are tied off adjacent the head section H and are interconnected to a roof jack adjacent the belt tailpiece G, the strands having a slack portion 124 extending from the connection to the roof jack, and about the sheaves 117, from whence they extend to the spool (not shown) upon which the strands are normally stored and transported. Therefore, when the belt tailpiece is carried forward by tramming of the mobile drive unit the strands may be fed from their storage spools over the sheaves 117, and they will be thus set up in substantial alignment for the performance of their supporting function. These stands are supported above the ground level by means of standards 125 in position for receiving the idler assembles 121. These standards 125 have an idler roller 126 for supporting the return reach of the belt.

Figure 1A:
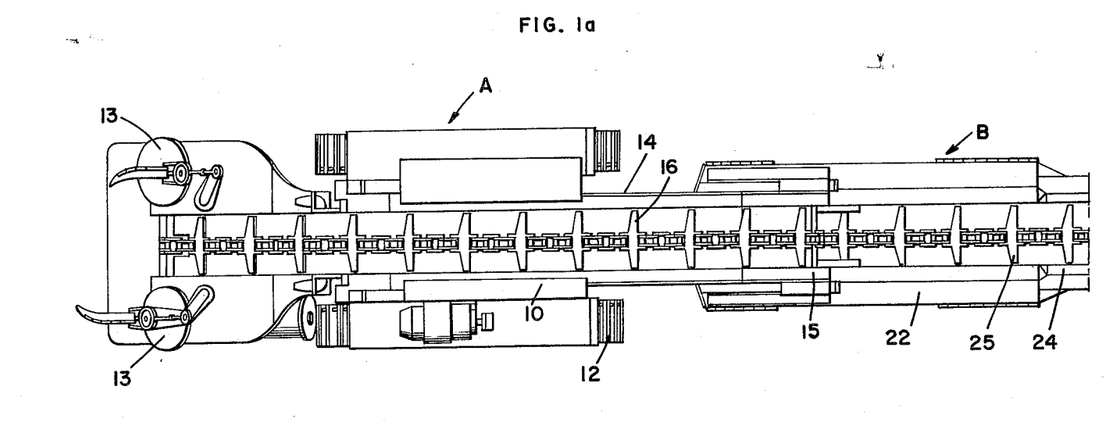
Figure 1B:
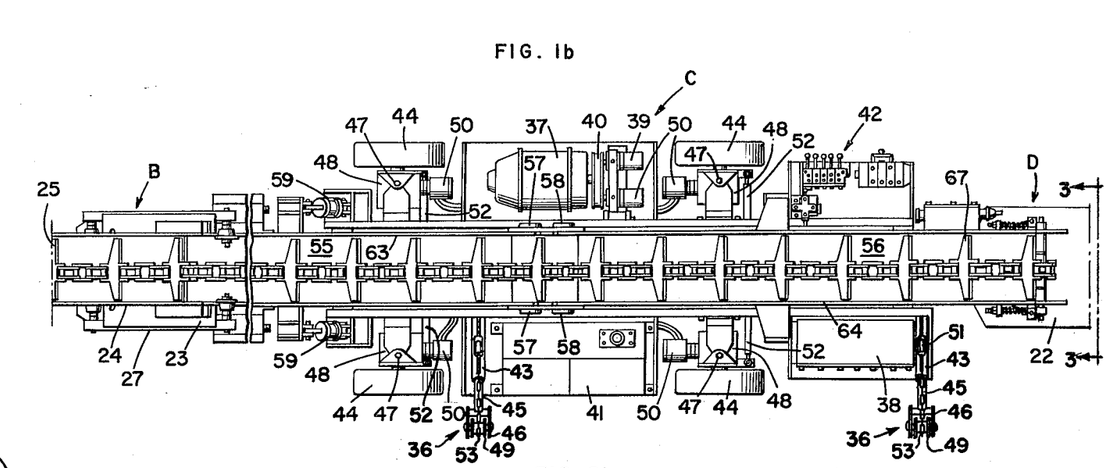
Figure 1C:
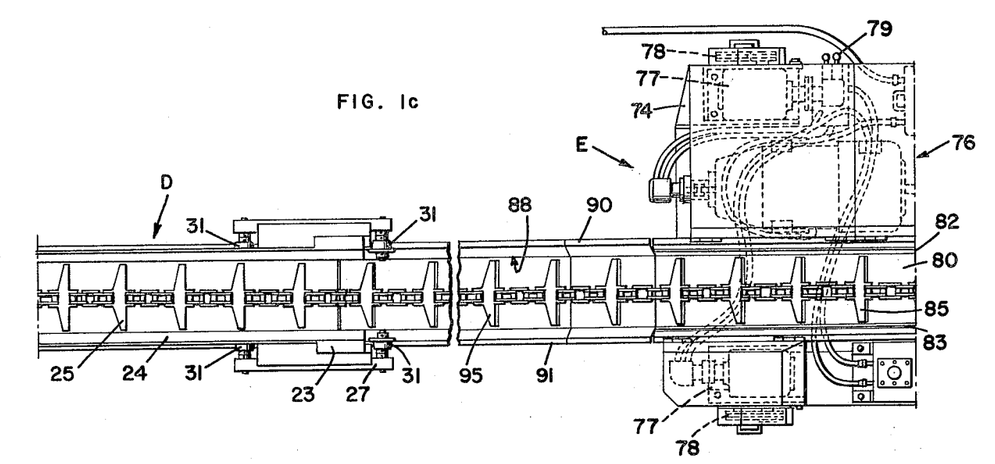
Figure 1D:
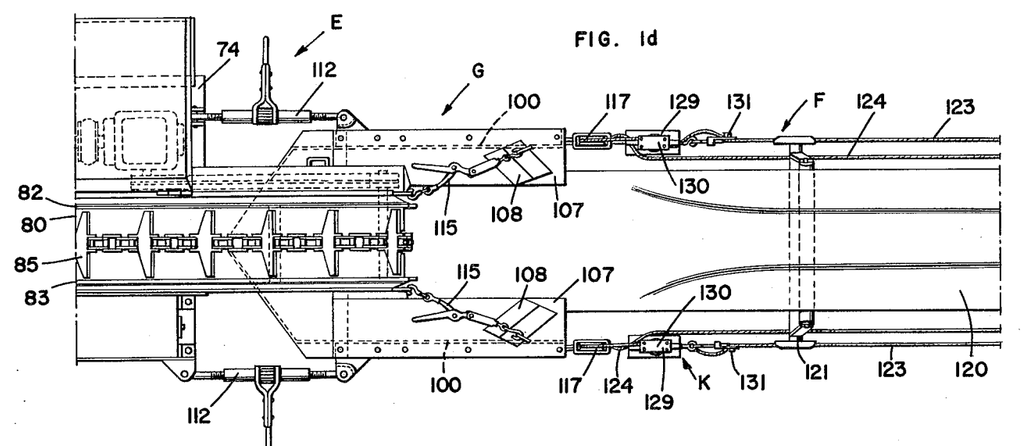
Figure 2A:
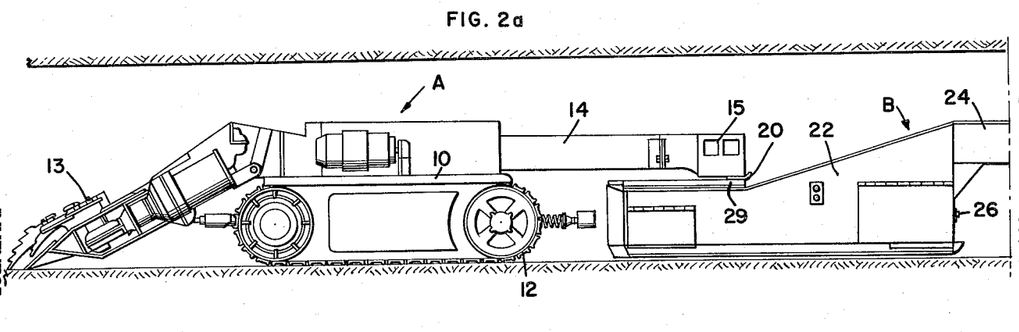
FIGS. 2a, 2b, 2c, 2d, 2e, and 2f constitute a broken view in side elevation of the assembly shown in FIGS. 1a, 1b, 1c, 1d, 1e, and 1f.
Figure 2B:
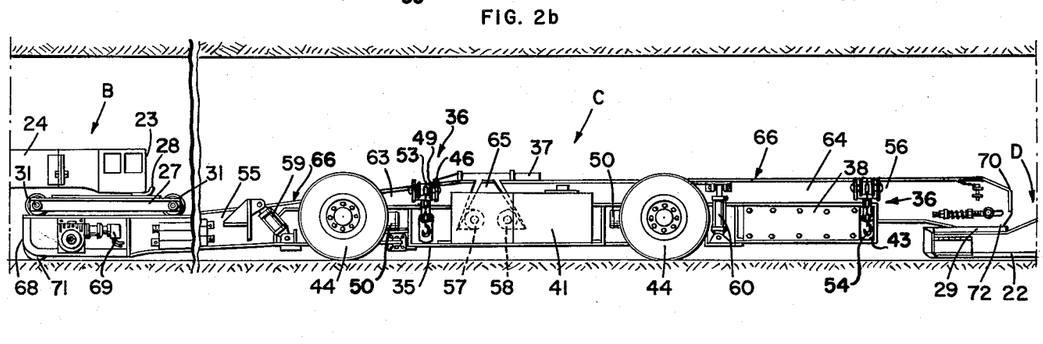
Figure 2C:
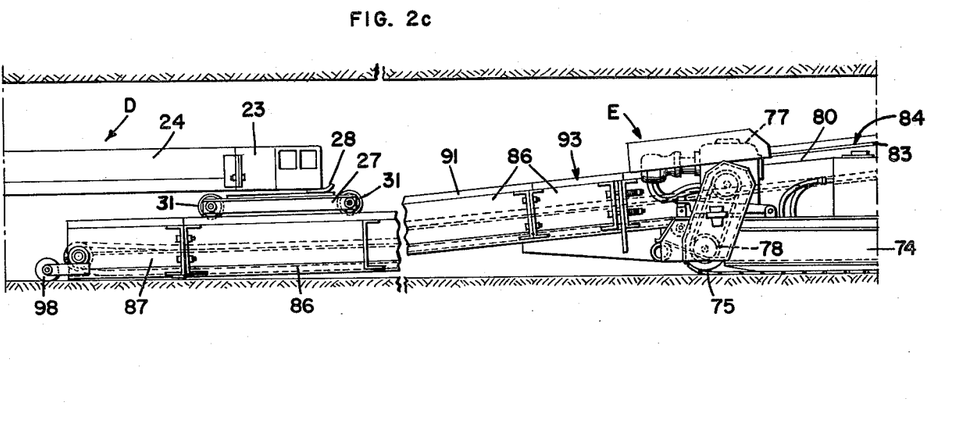
Figure 2D:
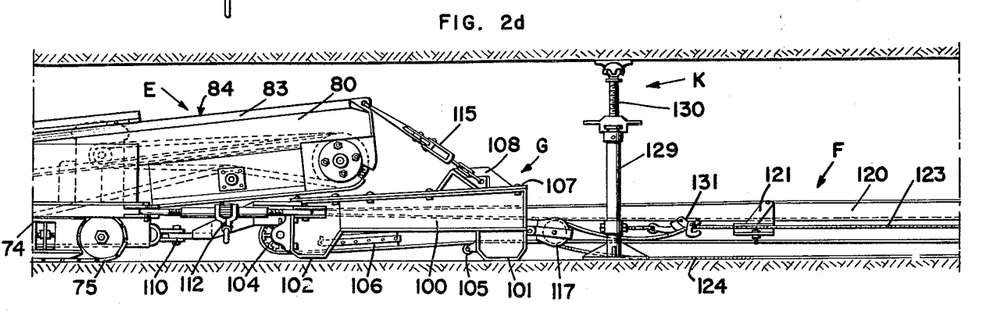

As the mine heading is advanced these belt conveyors will be considerably extended, usually to lengths of a thousand feet or more, and it has been found desirable to tie off the strands at intervals. In this connection roof jacks are preferably utilized so that a firm end support for the strands may be established. I have shown several types of roof jacks that may be used, dependent upon their location. The tie-off stands 129, shown in FIGS. 1$^d$ and 2$^d$ are fixedly secured by roof jacks 130 that extend between the roof and floor, and each is provided with a strand clamp 131 for gripping the strand and holding it in a sustantially fixed position, the slack portion of the strand extending past the clamp 131 and about the sheave 117, as has been previously described. This type of roof jack is preferably used in the position in which it is shown, i.e., adjacent the tailpiece for gripping the strand intermediate its length and securing it adjacent one end of the belt conveyor, with a length of the strand extending past this one end of the belt conveyor.

Figure 1E:
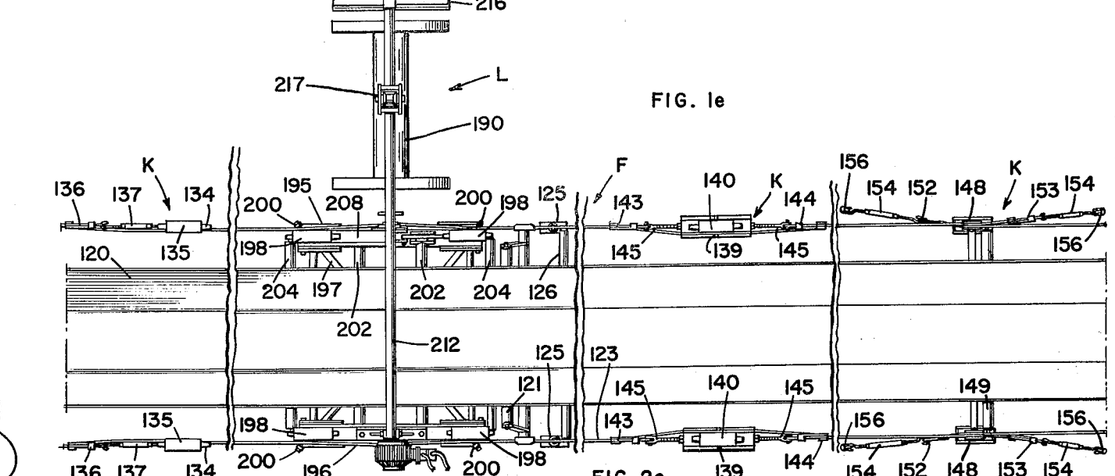
Figure 1F:
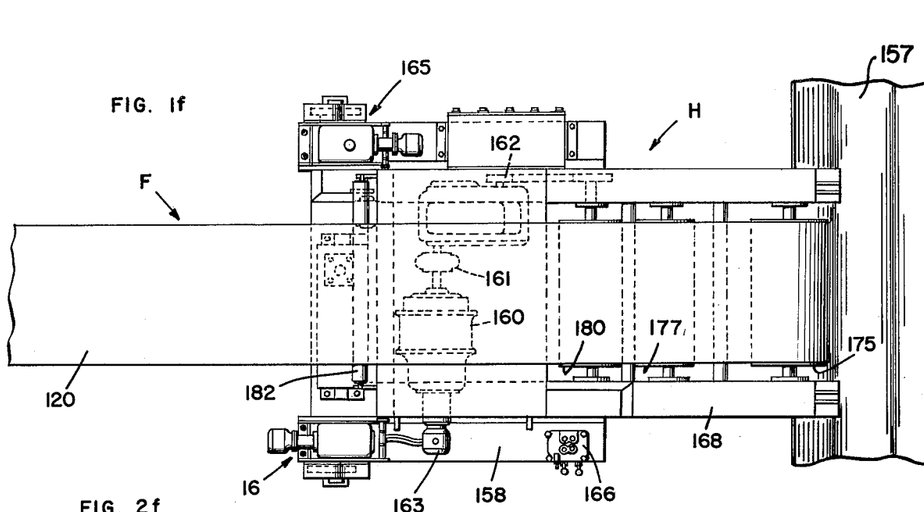
Figure 2E:
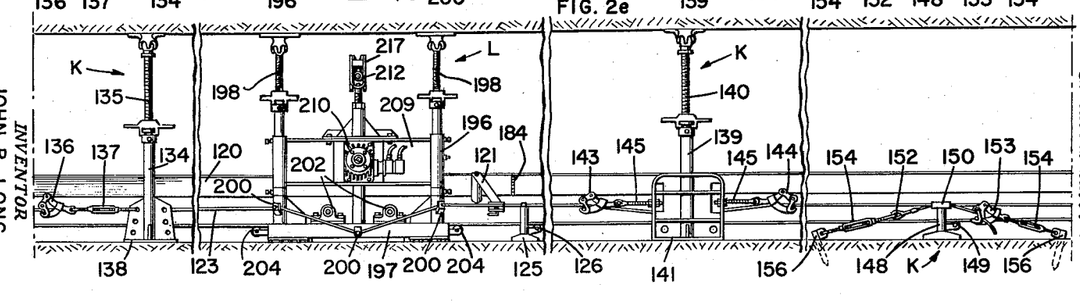

The tie-off stands 134, shown in FIGS. 1e and 2e, are likewise supports that are designed to be utilized adjacent the belt tailpiece. These stands are designed for rapid setups and gripping of the rope intermediate its length, there being provided a roof jack support 135 for each stand, and a rope gripping clamp 136 that is secured to the stand 134 by means of a turnbuckle 137. In such construction, the stand 134 is secured in place by the roof jack 135 and the rope gripping clamp 136 is secured to the strand, the tension on the strand thereafter being adjusted by turning of the turnbuckle 137. This stand 134 may be provided with a relatively broad base 138 for securement to the mine bottom by fastening means in the event a roof jack cannot be used.

Also shown in FIGS. 1e and 2e are the strand tie-offs stands 139 that may be secured in position by roof jacks 140. These stands include a relatively broad base 141 to which are connected a pair of strand clamps 143 and 144 by means of clevis bolts and pins 145. The clamps 143 and 144 are preferably of the type providing a cam type of clamping action, so that the greater the pull upon the strands, the greater the gripping action. This construction is designed to support the strands intermediate their length. In connecting this type of jack to the strands, the stands are first secured in position by the roof jack and the clamps 143 and 144 secured to the strands; the desired tension is then applied to the strands by means of the clevis bolt and pin. It should be particularly noted that in this type of rope tie-off, the base 141 can be secured to the ground, whereupon it is unnecessary to use a roof jack.

For tying off the extreme ends of the strands I preferably use the tie-off stand 148, shown to the right hand sides of FIGS. 1e and 2e. Such a type of installation is used where the entries have been advanced sufficiently far for a semi-permanent installation. This type of tie-off replaces one of the usual strand supporting standards 125, the stand being provided with a return roller 149. A channel 150 is provided at the upper portion of the stand 148, the strands laying in the channel, and secured at either end thereof either by a hook and eye grip 152 or a rope gripping clamp 153, the units 152 or 153 each being attached to a turnbuckle 154, the other end of the turnbuckle being secured to the ground floor by means of a bottom anchor rod 156.

The head section H may be of any conventional construction, for orbital movement of the conveying reach of the belt 120 in receiving material upon the belt adjacent the belt tailpiece G and discharging the material onto a main line conveyor 157. The head section H preferably includes a main frame 158 that is mounted upon crawlers 159 in a conventional manner. An electric motor 160 is mounted on the frame 158 for driving the rolls of the head section through coupling 161 and gear box 162, the motor 160 also driving the hydraulic pump 163 that serves as the prime mover for the hydraulic motors and gear reducers 165 that drives the crawler 159. Flow of hydraulic fluid and motivation of the hydraulic motors are governed by the controls 166.

Figure 2F:
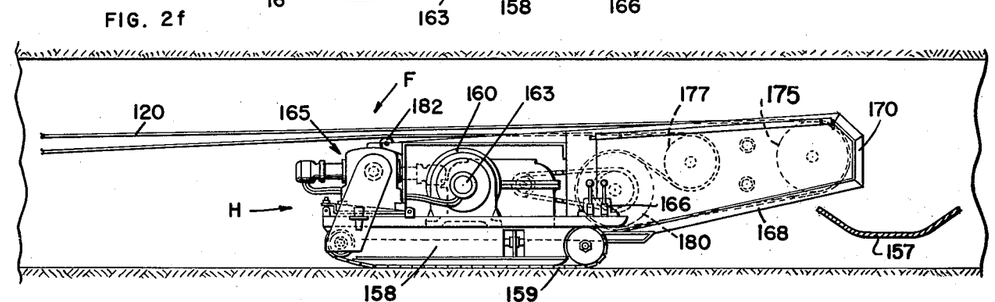

The frame 158 includes a boom 168 that supports the drive rollers for orbitally moving the conveyor belt for conveying material from the belt tailpiece to the discharge end 170 of the head section. Preferably three rollers are provided, idler roller 177 and drive rollers 175 and 180. It will be seen from FIG. 2f that as the conveying reach of the belt approaches the head it passes over drive roller 175, which roller contacts the lower surface of the conveying reach of the belt. The belt extends from drive roller 175, adjacent the lowermost portion of the boom 168, and is taken up around drive roller 180. This roller 180 likewise contacts what would be the bottom surface of the conveying reach of the belt, so that a clean surface for driving is presented to the drive rollers avoiding slippage or build up of material that might occur if the actual conveying surface of the belt were contacted, such slippage being due to the accumulation of dirt or moisture on the conveying surface of the belt. This arrangement results in a minimum 420° arc of contact on the clean side of the belt. The belt then extends from the drive roller 180 and is looped about the idler roller 177, extending rearwardly toward the belt tailpiece in a return reach. The return reach may be supported at the rearward portion of the head section by a small idler roller 182.

In the extension of the belt conveyor, which extension will be taken care of by paying out additional lengths of the strand from the storage roller over the sheaves 117, and the proper positioning of the standards 125 thereunder and affixing of the idler rollers 121 to the strands, additional lengths of belting may be added to the conveyor. Such lengths of belting are usually stored upon reels in lengths of one hundred feet or more, so it can be readily understood that such addition of belting may be extremely cumbersome, and I have therefore provided a belt handling apparatus L. This belt handling apparatus L is more fully described in my copending application Serial No. 799,771, filed March 16, 1959. In the drawings I have shown the belting as having just been spliced into the conveyor at a splice 184 and the empty spool 190 removed to one side of the conveyor.

This belting handling apparatus L preferably includes spaced side members 195 and 196 that are supported in a spaced apart relationship upon a suitably braced base 197, the base and side members being secured in position by the roof jacks 198. Lugs 200 may be provided upon each of the side members for interlacing with the flexible side strands 123 of a strand supported belt conveyor, which interlacing serves to retain the belt handling apparatus in alignment with the conveyor for insertion of the belt. Mounted upon the base are a pair of rollers 202 for supporting the reel 190 upon the base in a freely rotative position when the belt is inserted in the conveyor, and a pair of rollers 204 may be provided at each end of the base for supporting the return reach of the conveyor belt. The side member 195 is provided with a door-like bracket 208 which swings open so that the reel of belting can be properly positioned upon the rollers 202, and the side member 196 is provided with a bracket 209 that has a motor and reducer 210 suitably mounted thereupon for rotation of the reel 190 when it is desired to rewind the belt thereupon, when retracting the conveyor. When the belting is drawn from the reel, the same is accomplished by forward motion of the belt tailpiece, the reel 190 freely rotating on the rollers 202.

Supported upon the side member 196, and extending transversely across the conveyor, there is a supporting rod member 212 that is preferably in the form of a cylindrical tube. This tube is supported at the other end thereof by a hydraulic cylinder 215 that is mounted upon a ground engaging base 216. Mounted upon the cylindrical rod 212 is a trolley 217 that is provided with a suitable gripping means for engaging the reel 190 at the ends thereof. Therefore, when it is desired to place a reel of belting in the conveyor, the grips are engaged upon the side edges of the reel 190, the hydraulic cylinder 215 extended, so that the end of the rod 212 opposite the side member 196 is raised, thus lifting the reel from the ground, the door 208 opened, the trolley and reel supported thereby moved into proper position between the side members 195 and 196, the door 208 closed, and the hydraulic cylinder 215 lowered, placing the reel upon the rollers 202.

I have found that optimum results may be obtained when the self-propelled dirigible loading machine A is approximately twenty-two feet long; the elongated transfer conveyor B is approximately thirty-two feet long; the mobile carrier C is approximately twenty-six feet long; the elongated transfer conveyor D is approximately thirty-eight feet long; and the mobile drive unit, including the extended pan sections is approximately ninety feet long. The pan sections of the mobile drive unit E may be effectively extended up to one hundred and fifty feet. However, for the purposes of illustration, I prefer to designate the effective length as ninety feet. Such construction will give an effective loading radius from the end pan section 87 of the mobile drive unit E of approximately one hundred and twenty feet, as indicated by reference character X in FIG. 4. When a continuous miner is used ahead of the loader, this will add approximately thirty feet to the effective length, yielding a total loading radius of approximately one hundred and fifty feet, as shown in FIGS. 5–9.

Referring to FIG. 4, I have herein shown one plan of mining according to my system. As constituted in this view the apparatus has, from its previous position, been used to mine a center room 220, left breakthroughs 221, a left room 222, left extended breakthroughs 223, right breakthroughs 224, a right room 225, and right extended breakthroughs 226. The initial movement of the apparatus will be into position as shown in full lines, with the elongated transfer conveyor D fully telescoped upon the mobile drive unit E, and the elongated transfer conveyor B fully telescoped upon the mobile bridge carrier C. In this position the entire three unit bridge, including the mobile carrier C, and the two elongated transfer conveyors B and D are recoiled into the center room 220 alongside the mobile drive unit E so that the length of the three unit bridge is substantially equal to the length of the drive unit E, including the pan sections.

The next step in the mining operation, after the apparatus has been moved from its previouse position to that shown in full lines in FIG. 4. are as follows: the right breakthrough 224ᵃ is entered, the entry extending across the right room 225, and into the right extended breakthrough 226ᵃ. The mobile bridge carrier C is then somewhat retracted, and the right room 225ᵃ is entered. The unit is then retracted and the left breakthrough 221a is entered, such entry extending across the left room 222 and into the extended breakthrough 223ᵃ. The bridge carrier C is then somewhat retracted and the left room 222ᵃ is entered. The unit is then retracted and the center room 220a is entered and advanced to the full length that may be entered from this positioning of the mobile drive unit E. A second left breakthrough 221ᵇ is then partially entered, to the full length of the extension from the setting of the mobile drive unit E. The unit is then retracted and a second right breakthrough 224ᵇ is entered, to the full length that may be extended from this setting of the mobile drive unit E. At this point the entire sequence of operation from this particular setting of the mobile unit E has been accomplished, the material has been mined within the dotted segments 220ᵃ, 221ᵃ, 221ᵇ, 222ᵃ, 222ᵇ, 223ᵃ, 224ᵃ, 224ᵇ, 225ᵃ, and 226ᵃ, and it is now necessary to advance the mobile drive unit E and add an additional length of belting to the belt conveyor F. In such operation the belt 120 is rotated so that the splice 184 approximates the position of the belt handling apparatus L, a new reel of belting is aligned by the belt handling apparatus L into position for addition to the conveyor, one end of the reel of belting being spliced into the forward end of the conveyor belt, and the drive unit E is then trammed forward. Inasmuch as the belt tailpiece G is affixed to the mobile drive unit E, the pull thereupon will unroll the belting from the new reel. When the end of the belt on the reel has been reached, the same is then spliced into the other end of the conveyor belt. The reel is then removed by the belt handling apparatus L to one side of the conveyor, and the mobile drive unit E is then positioned for a further sequence of operation as previously described.

In FIGS. 5–9, inclusive, I have shown a mining plan for use with my system, in which a continuous miner M is positioned for discharge onto the loading machine A, or discharges onto the floor for pick-up by the loading machine A. In FIGS. 6–9 the system is shown in full lines in one position and in dotted lines in various positions to which it can be manipulated.

Figure 5:
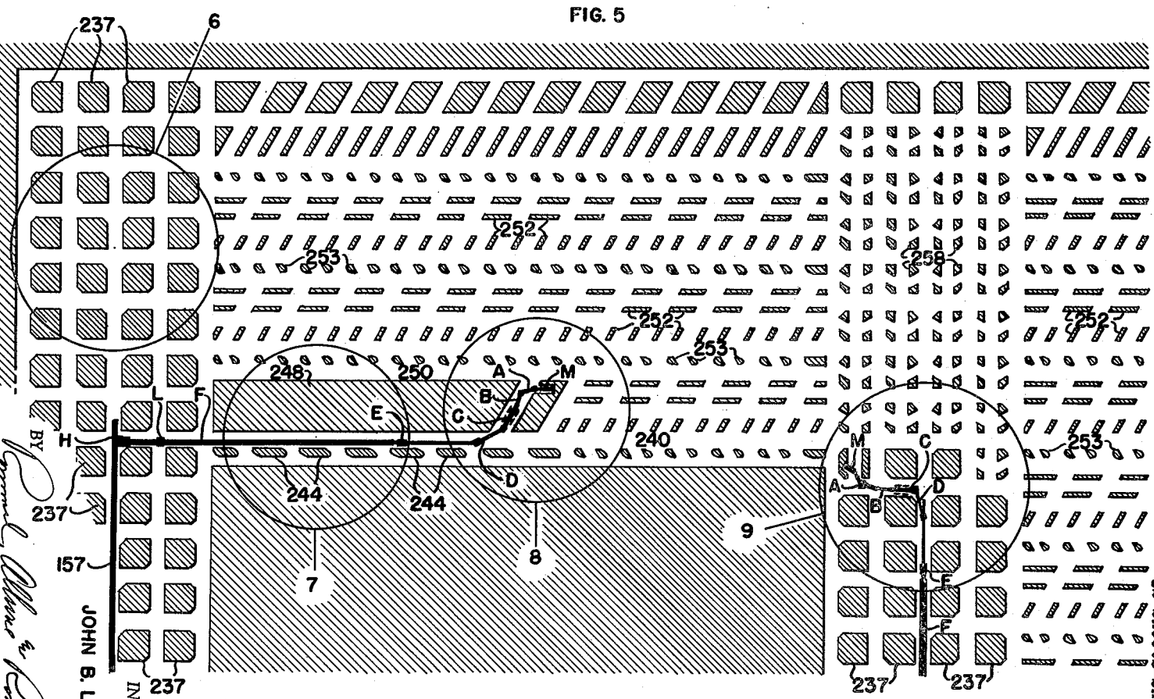
FIG. 5 is a mining plan showing use of my continuous conveying system, the same showing use of a continuous miner at the forward end of the system.

FIG. 5 discloses the overall mining plan, including the development of entries, development of rooms, removal of room pillars and removal of entry pillars. This view therefore includes the entire mining system, from initial entry to final withdrawal. Understanding of this overall mining plan is to be had by specific reference to the enlarged views of FIGS. 6–9 and the specific manipulation of my continuous conveying system for this mining plan will be referred to in the description of these figures.

FIG. 6 shows a plan of using my continuous conveying system at the start of a mining cycle, namely the developing of entries. In this FIG. the continuous miner, in juxtaposition with respect to my continuous conveying system, is shown in full lines mining the place 230 and there are shown in dotted lines the equipment mining the respective places 231, 232, 233, 234, 235, and 236, leaving the pillars 237 which support the mine roof. This figure amply illustrates the articulated reach of my conveying system, and the various places are mined by articulation and manipulation of the various elements in the same manner as has been previously described with respect to FIG. 4.

Figure 7:
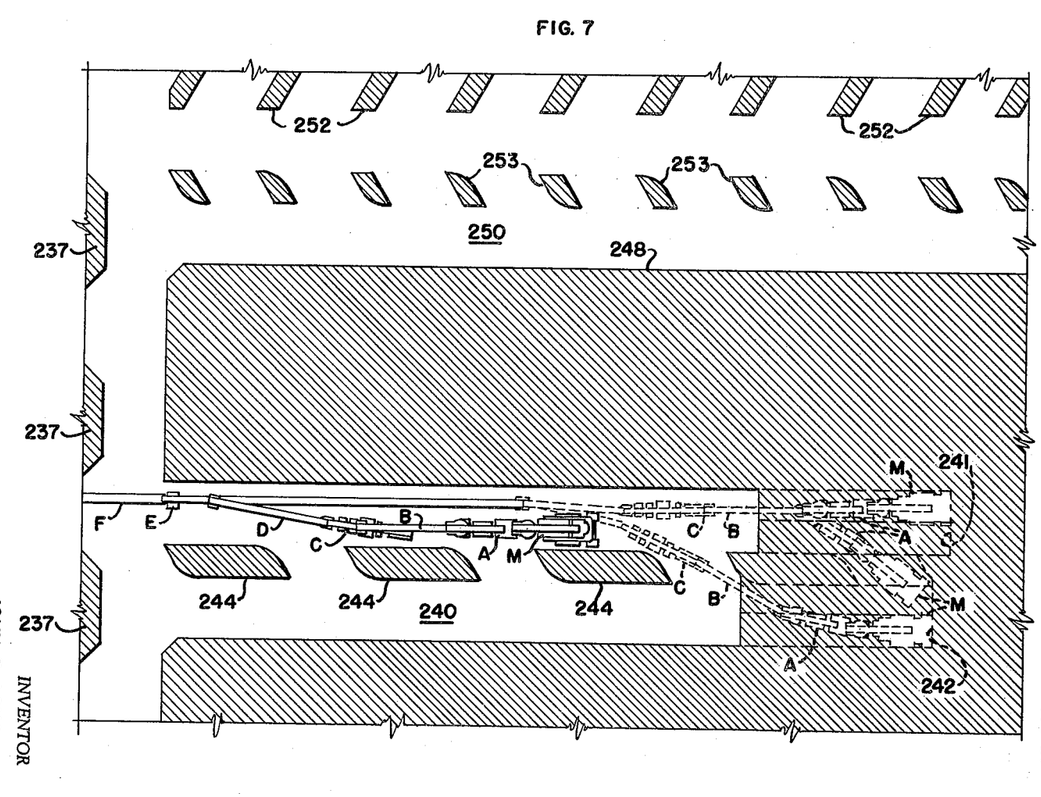
FIG. 7 is an enlarged view of the area designated as circle 7 of FIG. 5, showing the development of rooms in this plan.

After the development of the entries, the rooms 240 will be developed, as shown in FIG. 7. The development of these rooms requires facile mining extensions and also a great degree of articulation on the part of the apparatus used. As shown in FIG. 7, two places 241 and 242 may be mined from a single longitudinal extension, leaving pillars 244 remaining between these two places for support of the roof. Using equipment heretofore proposed, it would be necessary to drive each of these places separately, and a great amount of difficulty would be involved in breaking through between the places, between the pillars 244.

Figure 8:
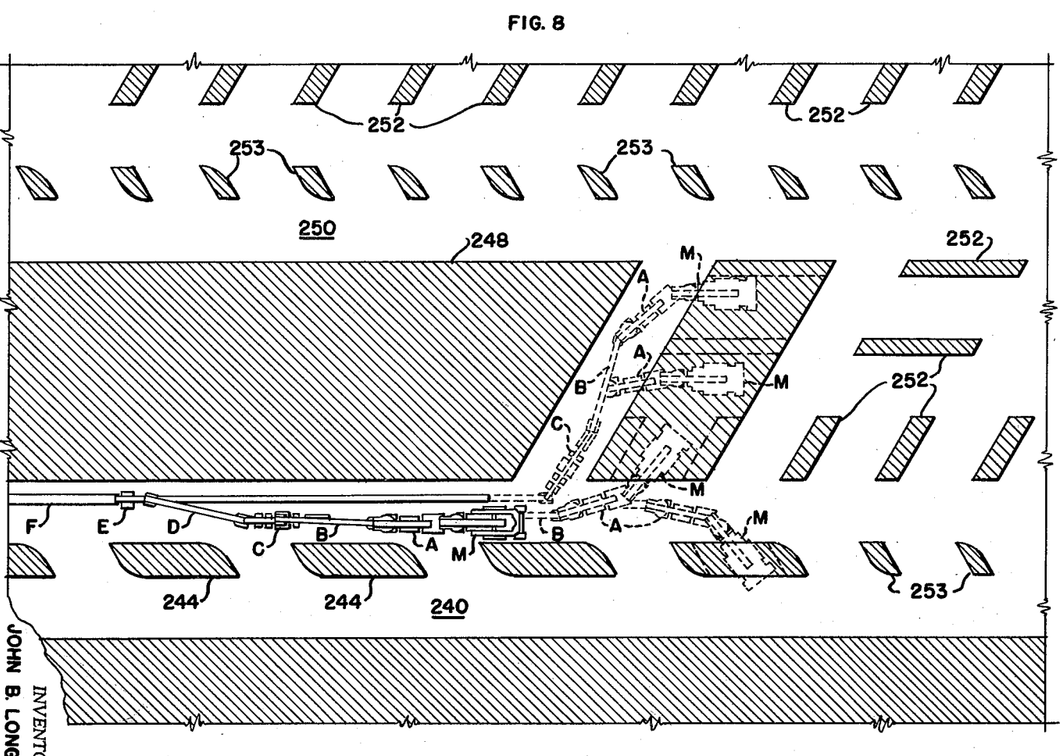
FIG. 8 is an enlarged view of the area designated as circle 8 of FIG. 5, showing the removal of room pillars in this plan.

After a room 240 has been completely extended, the next step in the mining plan is to remove the wall 248 that extends between the room 240 that has just been mined and the room 250 from which withdrawal has previously been made, as shown in FIG. 8. This is, in effect, a withdrawal from the room 240 and, upon removal of the wall 248, small supporting pillars 252 will be left to support the roof of the mine. The removal of this wall 248 is effected upon a withdrawal of the mining apparatus from the room 240, and at the same time such withdrawal is effected the room pillars 244 are substantially reduced in size, leaving small supporting pillars 253. Neither the mining of the wall or the removal of the room pillars involves any substantial degree of longitudinal movement of the equipment, but involves a plurality of sharp turns, requiring a high degree of articulation and manipulation of the apparatus. All of this mining in withdrawal from a room 240, is effected from one longitudinally extending base, the same being accomplished by manipulation and articulation of the mobile portions of the apparatus, thus substantially reducing the necessary belt moves and "pan-ups" that would be necessary with previously developed equipment.

Figure 9:
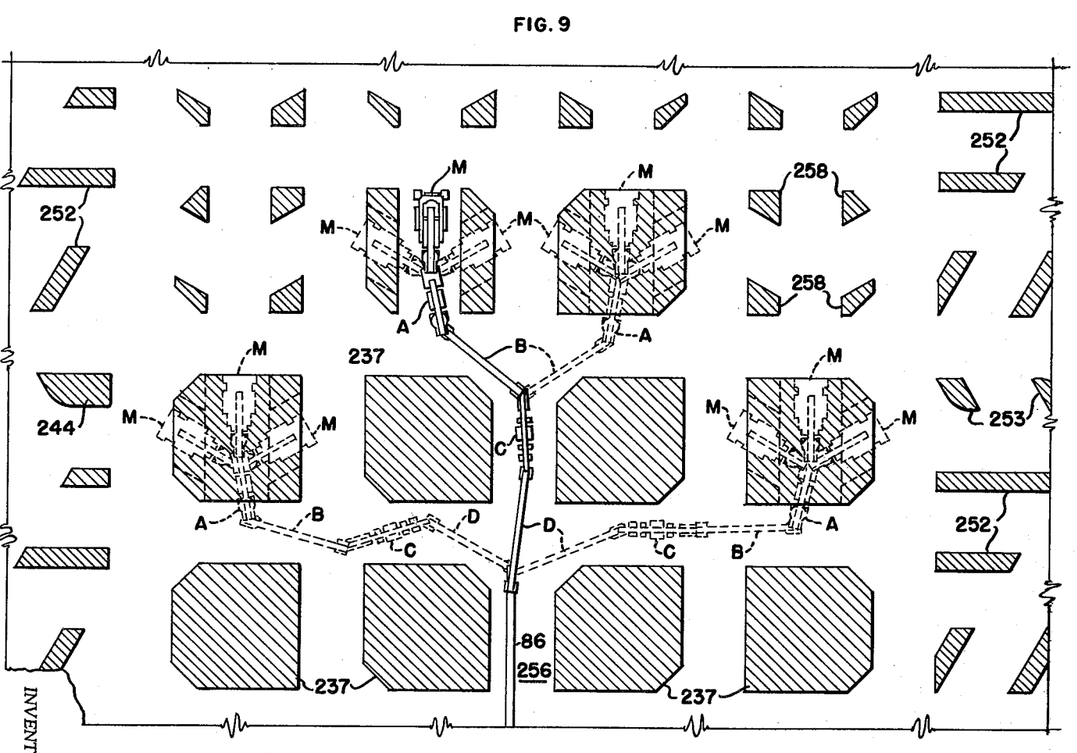
FIG. 9 is an enlarged view of the area designated as circle 9 of FIG. 5, showing the removal of entry pillars in this plan.

The next step in the mining plan is the withdrawal from the entries and removal of entry pillars, as shown in FIG. 9. Here again, the apparatus is not subjected to withdrawal in a straight path, but a series of sharp turns must be executed in order to effectively remove the entry pillars and, as shown in FIG. 9, four of the pillars 237 may be removed from a single entry 256. The removal of the entry pillars leaves only the narrow supports 258 for the mine roof.

When apparatus of my system is used, it will be seen that an extreme degree of articulation will be afforded, there being provided four different places in the unit whereby the sections can be rotated 180° with respect to each other. The interconnections providing 180° of rotation are as follows: The swivel connection between the loading machine A and the elongated transfer conveyor B; the swivel connection between the elongated transfer conveyor B and the mobile bridge carrier C; the swivel connection between the mobile bridge carrier C and the elongated transfer conveyor D; and the swivel connection between the elongated transfer conveyor D and the mobile drive unit E.

Although, for the purposes of convenience and clarity, this invention has been primarily described as a continuous conveying system for mining, and the relationship and method of use applied to a mining locale, it will be recognized that the system is readily adaptable to above ground installations and constructions, such as road building, and I do not intend that the system be limited to mining.

Various changes may be made to the form of the invention herein shown and described without departing from the spirit of the invention or the scope of the following claims.

I claim:

1. In a continuous conveying system including a plurality of conveying sections, a mobile bridge carrier mounted intermediate two of said conveying sections, said mobile bridge carrier including an elongated frame having a pair of boom-like end sections, said boom-like end sections being pivotally mounted at adjacent points centrally of said frame and being independently pivotal with respect to each other, one of said boom-like end sections extending forwardly of said frame for receiving one end of one of said conveying sections and being vertically pivotally movable for positioning with respect to said one end of one of said conveying sections and the other of said boom-like end sections extending rearwardly of said frame for receiving one end of another of said conveying sections and being vertically pivotally movable for positioning with respect to said one end of another of said conveying sections, said mobile bridge carrier including a continuous material moving conveyor extending throughout the length thereof for conveying material therealong from said one conveying section to said another conveying section.

2. A continuous conveying system as specified in claim 1 wherein a first lift boom means is mounted upon said frame to one end thereof and interconnected to one of said boom-like sections for pivotal movement thereof with respect to said frame and second lift boom means is mounted upon said frame to the other end thereof from said first lift boom means and interconnected to the other of said boom-like sections for pivotal movement thereof with respect to said frame.

3. In a continuous conveying system including a plurality of conveying sections, a mobile bridge carrier mounted intermediate two of said conveying sections, said mobile bridge carrier including a frame and a pair of boom-like end sections, said boom-like end sections being pivotally mounted upon said frame and independently pivotal with respect to each other, one of said boom-like end sections extending forwardly of said frame for receiving one end of one of said conveying sections and being vertically pivotally movable for positioning with respect to said one end of said one of said conveying sections and the other of said boom-like end sections extending rearwardly of said frame for receiving one end of another of said conveying sections and being vertically pivotally movable for positioning with respect to said one end of said another of said conveying sections, said boom-like end sections including track means receiving one end of one of said conveying sections movable therealong for telescopic movement thereof with respect to said mobile bridge carrier, said mobile bridge carrier including a material moving conveyor extending along said boom-like end sections for conveying material therealong from said one conveying section to said another conveying section.

4. In a continuous conveying system including a plurality of conveying sections, a mobile bridge carrier mounted intermediate two of said conveying sections, said mobile bridge carrier including a frame and a pair of spaced apart boom-like end sections, said boom-like end sections being individually pivotally mounted upon said frame and independently pivotal with respect to each other, one of said boom-like end sections extending forwardly of said frame for receiving one end of one of said conveying sections and being vertically pivotally movable for positioning with respect to said one end of said one of said conveying sections, and the other of said boom-like end sections extending rearwardly of said frame for receiving one end of another of said conveying sections and being vertically pivotally movable for positioning with respect to said one end of said another of said conveying sections, said boom-like end sections including track means and said frame including track means intermediate the spaced apart ends of said boom-like end sections, said first and second mentioned track means receiving one end of one of said conveying sections movably therealong for telescopic movement thereof with respect to said mobile bridge carrier, said mobile bridge carrier including a material moving conveyor extending along said boom-like end sections for conveying material therealong from said one conveying section to said another conveying section .

5. In a continuous conveying system, a plurality of units including conveying sections and elongated transfer conveyors, and a belt conveyor, said conveying sections and elongated transfer conveyors being provided in a pivotally interconnected relationship for articulated movement with respect to each other and each including independently operable chain and link conveyors, each of said conveying sections and transfer conveyors being positioned in cascading discharging relationship with respect to the unit next adjacent thereto in the direction of the belt conveyor with each of said transfer conveyors being telescopically movable upon the conveying section immediately next adjacent thereto in the direction of the belt conveyor, a belt tailpiece for said belt conveyor pivotally secured to one of said conveying sections, and aligning means interconnecting said last mentioned conveyor section and said belt tailpiece for positioning the longitudinally extending conveying reach of said belt conveyor with respect to the chain and link conveyor of said last mentioned conveying section, providing interconnected articulated and extensible chain and link conveyor sections discharging onto an aligned belt conveyor.

6. A continuous conveying system including an elongated transfer conveyor, said elongated transfer conveyor including carriage means; mobile apparatus pivotally connected to one end of said elongated transfer conveyor for loading material onto said elongated transfer conveyor; a mobile carrier connected to the other end of said elongated transfer conveyor from said mobile apparatus, said mobile bridge carrier including elongated track means extending substantially throughout the length thereof for movement of said carriage means therealong and providing for telescopic movement of said first elongated transfer conveyor with respect to said mobile bridge carrier, a receiving boom provided upon said moblie bridge carrier and forming a portion of said track means, and said mobile bridge carrier including a plurality of spaced running gear, each of the running gear being independently steerable with respect to the other of said running gear, said running gear being spaced apart a relatively short distance with respect to the overall length of said track means and forming a base therefor, with said receiving boom extending a substantial distance outwardly from the base provided by said running gear, so that by turning the running gear to travel in a circular path the said receiving boom may be moved arcuately a substantial distance to either the right or left with little forward or reverse movement of the mobile carrier.

References Cited in the file of this patent

UNITED STATES PATENTS

| | | |
|---|---|---|
| 1,214,968 | Steele | Feb. 6, 1917 |
| 1,430,183 | Petersen | Sept. 26, 1922 |
| 1,624,505 | Pratt | Apr. 12, 1927 |
| 1,932,897 | Jaggard | Oct. 31, 1933 |
| 2,338,160 | Arentzen | Jan. 4, 1944 |
| 2,479,823 | Ernst | Aug. 23, 1949 |
| 2,514,993 | Ernst | July 11, 1950 |
| 2,558,629 | Smida | June 26, 1951 |
| 2,616,666 | Honey | Nov. 4, 1952 |
| 2,638,200 | Russell | May 12, 1953 |
| 2,715,014 | Garnett | Aug. 9, 1955 |
| 2,753,971 | Ball | July 10, 1956 |
| 2,799,386 | Moon | July 16, 1957 |

FOREIGN PATENTS

| | | |
|---|---|---|
| 451,813 | Great Britain | Aug. 12, 1936 |
| 522,950 | Great Britain | July 2, 1940 |
| 1,211,571 | France | Oct. 12, 1959 |